United States Patent
Bahng

(10) Patent No.: US 11,089,615 B2
(45) Date of Patent: Aug. 10, 2021

(54) METHOD FOR DATA RETRANSMISSION IN WIRELESS COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventor: Seung Jae Bahng, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 81 days.

(21) Appl. No.: 16/671,210

(22) Filed: Nov. 1, 2019

(65) Prior Publication Data
US 2020/0154461 A1 May 14, 2020

(30) Foreign Application Priority Data
Nov. 13, 2018 (KR) .................. 10-2018-0139080

(51) Int. Cl.
- *H04W 72/12* (2009.01)
- *H04W 28/06* (2009.01)
- *H04L 27/26* (2006.01)
- *H04L 5/00* (2006.01)
- *H04W 72/04* (2009.01)

(52) U.S. Cl.
CPC ......... *H04W 72/1263* (2013.01); *H04L 5/001* (2013.01); *H04L 27/2627* (2013.01); *H04W 28/06* (2013.01); *H04W 72/042* (2013.01)

(58) Field of Classification Search
None
See application file for complete search history.

(56) References Cited

U.S. PATENT DOCUMENTS

| 9,661,623 B2 | 5/2017 | Jiang et al. |
| 9,894,651 B2 | 2/2018 | Novlan et al. |

(Continued)

FOREIGN PATENT DOCUMENTS

WO  2018/174530 A1  9/2018

OTHER PUBLICATIONS

Liyu Cai et al., "Improved HARQ scheme using channel quality feedback for OFDM systems", Vehicular Technology Conference, 2004. VTC 2004-Spring. 2004 IEEE 59th.

*Primary Examiner* — Chi H Pham
*Assistant Examiner* — Vladislav Y Agureyev
(74) *Attorney, Agent, or Firm* — LRK Patent Law Firm

(57) ABSTRACT

An operation method of a transmitting apparatus in a wireless communication system includes transmitting, to a receiving apparatus, reverse mapping flag information indicating a direction of mapping data symbols to one or more subcarriers included in a resource block allocated to the receiving apparatus; mapping the data symbols to the one or more subcarriers of the resource block based on the reverse mapping flag information; and transmitting the resource block to the receiving apparatus. According to the embodiments of the present disclosure, the amount of subcarrier phase shift noises due to an SFO occurring in proportion to synchronization impairment and subcarrier index can be reduced in a multi-carrier communication system, thereby increasing data retransmission efficiency.

14 Claims, 8 Drawing Sheets

(56) References Cited

U.S. PATENT DOCUMENTS

| | | |
|---|---|---|
| 9,999,074 B2 | 6/2018 | Moon et al. |
| 10,855,503 B2* | 12/2020 | Kuchi ............... H04L 27/2634 |
| 10,951,291 B2* | 3/2021 | Xi ..................... H04W 72/046 |
| 2009/0240999 A1 | 9/2009 | Lee et al. |
| 2010/0312943 A1* | 12/2010 | Uehara ............... G06F 13/387 |
| | | 710/316 |
| 2011/0110437 A1* | 5/2011 | Kim .................... H04L 1/0072 |
| | | 375/259 |
| 2012/0057559 A1* | 3/2012 | Ahn .................... H04L 1/0068 |
| | | 370/329 |
| 2012/0147273 A1* | 6/2012 | Mourad ................. H04N 5/38 |
| | | 348/723 |
| 2013/0229996 A1* | 9/2013 | Wang .................. H04L 1/1685 |
| | | 370/329 |
| 2014/0301345 A1* | 10/2014 | Kim .................... H04L 1/1671 |
| | | 370/329 |
| 2014/0376356 A1* | 12/2014 | Park .................... H04L 5/0012 |
| | | 370/203 |
| 2015/0071195 A1* | 3/2015 | Park .................... H04L 5/0048 |
| | | 370/329 |
| 2015/0173070 A1* | 6/2015 | Aboul-Magd ........... H04L 5/14 |
| | | 370/329 |
| 2015/0245308 A1* | 8/2015 | Lorca Hernando ... H04L 5/0007 |
| | | 370/209 |
| 2016/0112970 A1* | 4/2016 | Chen ................... H04B 7/0617 |
| | | 455/522 |
| 2017/0041929 A1* | 2/2017 | Noh ..................... H04L 5/0094 |
| 2017/0086028 A1* | 3/2017 | Hwang ................. H04W 72/02 |
| 2017/0170937 A1 | 6/2017 | Chun et al. |
| 2017/0215188 A1 | 7/2017 | Kim et al. |
| 2017/0223665 A1* | 8/2017 | Chun .................... H04B 7/0695 |
| 2017/0230218 A1* | 8/2017 | Park .................... H04L 27/2608 |
| 2017/0230220 A1* | 8/2017 | Anwyl ................. H04L 1/0003 |
| 2017/0237532 A1* | 8/2017 | Li ........................ H04L 5/0007 |
| | | 370/338 |
| 2017/0289962 A1 | 10/2017 | Kim et al. |
| 2017/0303280 A1 | 10/2017 | Chun et al. |
| 2017/0339692 A1* | 11/2017 | Chun ................ H04W 72/0446 |
| 2018/0175993 A1* | 6/2018 | Onggosanusi .... H04W 72/0446 |
| 2018/0205586 A1* | 7/2018 | Park .................... H04L 27/262 |
| 2018/0302205 A1* | 10/2018 | Abedini ............... H04J 11/0076 |
| 2018/0317197 A1* | 11/2018 | Kasher ................ H04W 72/048 |
| 2018/0343081 A1* | 11/2018 | Lopez .................. H04L 5/0007 |
| 2019/0140808 A1* | 5/2019 | Matsuda ............... H04L 5/0048 |
| 2019/0200348 A1* | 6/2019 | Chae ......................... H04L 1/00 |
| 2019/0246378 A1* | 8/2019 | Islam .................. H04W 72/042 |
| 2019/0319768 A1* | 10/2019 | Wu ....................... H04L 1/1671 |
| 2019/0379487 A1* | 12/2019 | Hwang ................. H04L 1/0068 |
| 2020/0028639 A1* | 1/2020 | Lindqvist ............. H04L 1/0023 |
| 2020/0112410 A1* | 4/2020 | Takeda ............. H04W 72/1268 |
| 2020/0296756 A1* | 9/2020 | Lee ....................... H04L 5/0094 |

* cited by examiner

METHOD FOR DATA RETRANSMISSION IN WIRELESS COMMUNICATION SYSTEM AND APPARATUS FOR THE SAME

CROSS-REFERENCE TO RELATED APPLICATION(S)

This application claims priority to Korean Patent Application No. 10-2018-0139080, filed on Nov. 13, 2018 in the Korean Intellectual Property Office (KIPO), the entire content of which is hereby incorporated by reference.

BACKGROUND

1. Field of the Invention

The present disclosure relates to a method and an apparatus for transmitting and receiving data in a wireless communication system, and more particularly, to a method and an apparatus for retransmitting data in which a transmission error occurs in a multi-carrier communication system.

2. Description of Related Art

Multi-carrier transmission using a plurality of subcarriers is used as one of methods for extending a transmission bandwidth without increasing signal damages due to frequency selectivity of a radio channel. The orthogonal frequency division multiplexing (OFDM), which is a typical example of the multi-carrier transmission, can perform channel compensation by transforming a frequency-selective radio channel into flat narrow-band channels by arranging OFDM subcarriers orthogonally in the frequency axis.

However, the OFDM scheme is sensitive to high peak-to-average power ratio (PAPR) and synchronization impairment at a receiving apparatus. A symbol time-synchronization error due to the synchronization impairment may cause inter-block interference (IBI), and a frequency-synchronization error may cause inter-carrier interference (ICI). Further, a sampling frequency offset (SFO) due to the synchronization impairment may cause a slow drift of a fast-Fourier-transform (FFT) window at the receiving apparatus, which causes problems such as the ICI, a carrier phase rotation, and a signal amplitude distortion. Particularly, there is a problem that the carrier phase rotation due to the synchronization impairment and a resulting phase shift increase or decrease in proportion to an index of a subcarrier to which data is mapped increases.

SUMMARY

In order to solve the above-described problem, embodiments of the present disclosure provide an operation method of a transmitting apparatus for mapping data to subcarriers within a resource block, which increases retransmission efficiency in a wireless communication system.

In order to solve the above-described problem, embodiments of the present disclosure also provide an operation method of a receiving apparatus for mapping data to subcarriers within a resource block, which increases retransmission efficiency in a wireless communication system.

In order to solve the above-described problem, embodiments of the present disclosure also provide a receiving apparatus for mapping data to subcarriers within a resource block, which increases retransmission efficiency in a wireless communication system.

In order to achieve the objective of the present disclosure, an operation method of a transmitting apparatus in a wireless communication system may comprise transmitting, to a receiving apparatus, reverse mapping flag information indicating a direction of mapping data symbols to one or more subcarriers included in a resource block allocated to the receiving apparatus; mapping the data symbols to the one or more subcarriers of the resource block based on the reverse mapping flag information; and transmitting the resource block to the receiving apparatus.

The reverse mapping flag information may be determined according to a transmission mode.

The transmission mode may correspond to at least one of an initial transmission, a retransmission, an odd-numbered retransmission, and an even-numbered retransmission of the data symbols to the receiving apparatus.

The direction of mapping may correspond to one of a frequency-increasing direction of subcarriers to which the data symbols are mapped and a frequency-decreasing direction of subcarriers to which the data symbols are mapped.

The operation method may further comprise receiving, from the receiving apparatus, retransmission request information indicating that the data symbols are required to be retransmitted.

The reverse mapping flag information may be transmitted through a physical downlink control channel (PDCCH).

The reverse mapping flag information may be transmitted through at least one of a signal (SIG) field, a high throughput signal (HT-SIG) field, and a very high throughput signal (VHT-SIG) field.

Furthermore, in order to achieve the objective of the present disclosure, an operation method of a receiving apparatus in a wireless communication system may comprise receiving, from a transmitting apparatus, reverse mapping flag information indicating a direction of mapping data symbols to one or more subcarriers included in a resource block allocated by the transmitting apparatus; and receiving, from the transmitting apparatus, the data symbols mapped to the one or more subcarriers included in the resource block based on the reverse mapping flag information.

The reverse mapping flag information may be determined according to a transmission mode.

The transmission mode may correspond to at least one of an initial transmission, a retransmission, an odd-numbered retransmission, and an even-numbered retransmission of the data symbols from the transmitting apparatus The direction of mapping may correspond to one of a frequency-increasing direction of subcarriers to which the data symbols are mapped and a frequency-decreasing direction of subcarriers to which the data symbols are mapped.

The operation method may further comprise transmitting, to the transmitting apparatus, retransmission request information indicating that the data symbols are required to be retransmitted.

The reverse mapping flag information may be received through a physical downlink control channel (PDCCH).

The reverse mapping flag information may be received through at least one of a signal (SIG) field, a high throughput signal (HT-SIG) field, and a very high throughput signal (VHT-SIG) field.

Furthermore, in order to achieve the objective of the present disclosure, a receiving apparatus in a wireless communication system may comprise at least one processor, a memory storing at least one instruction executable by the at least one processor, and a transceiver controlled by the at least one processor. Also, when executed by the at least one processor, the at least one instruction may be configured to cause the transceiver to receive, from a transmitting apparatus, reverse mapping flag information indicating a direction of mapping data symbols to one or more subcarriers included in a resource block allocated by the transmitting apparatus; cause the transceiver to receive, from the transmitting apparatus, the data symbols mapped to the one or more subcarriers included in the resource block based on the reverse mapping flag information; and cause the transceiver to transmit, to the transmitting apparatus, retransmission request information indicating that the data symbols are required to be retransmitted.

The reverse mapping flag information may be determined according to a transmission mode.

The transmission mode may correspond to at least one of an initial transmission, a retransmission, an odd-numbered retransmission, and an even-numbered retransmission of the data symbols from the transmitting apparatus.

The direction of mapping may correspond to one of a frequency-increasing direction of subcarriers to which the data symbols are mapped and a frequency-decreasing direction of subcarriers to which the data symbols are mapped.

The reverse mapping flag information may be received through a physical downlink control channel (PDCCH).

The reverse mapping flag information may be received through at least one of a signal (SIG) field, a high throughput signal (HT-SIG) field, and a very high throughput signal (VHT-SIG) field.

According to the embodiments of the present disclosure, the amount of subcarrier phase shift noises due to an SFO occurring in proportion to a synchronization impairment and a subcarrier index can be reduced in a multi-carrier communication system, thereby increasing data retransmission efficiency.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
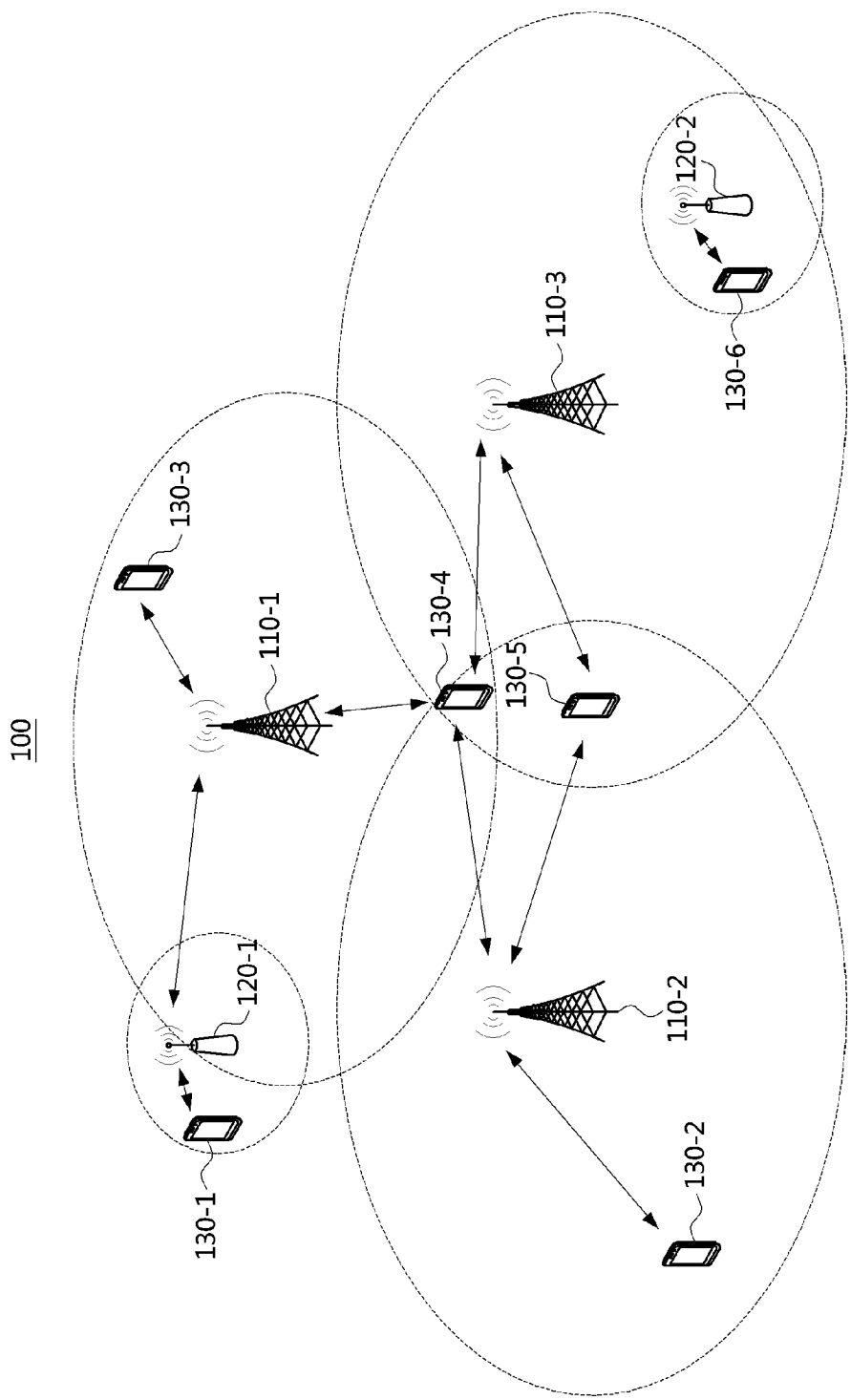
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may also be referred to as a 'communication network'. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
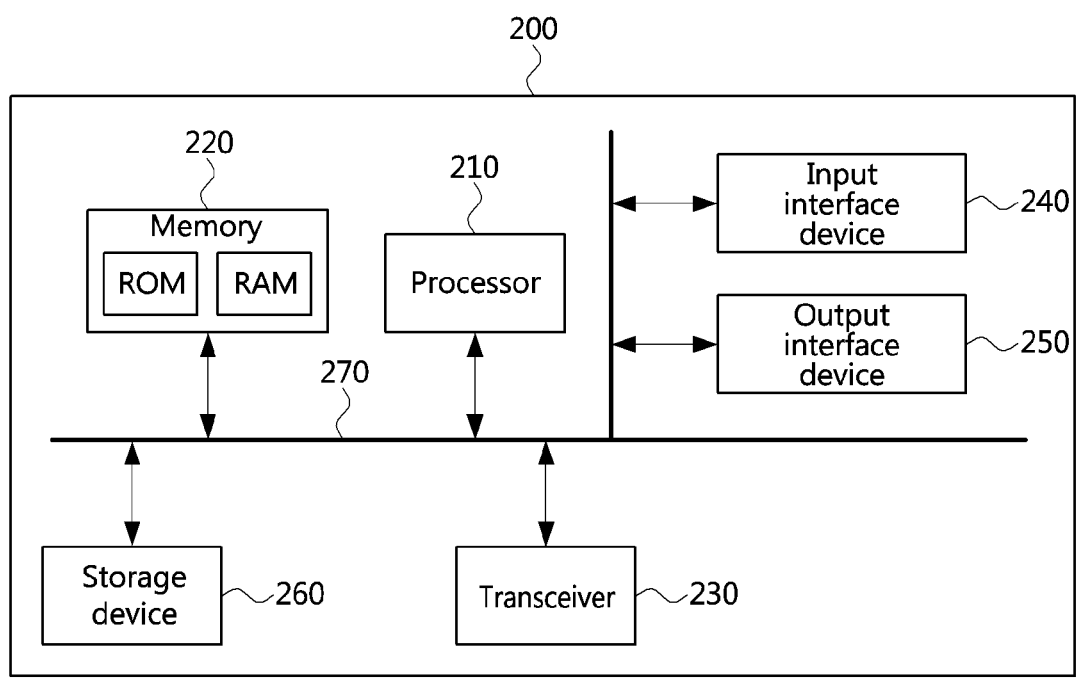
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-eNB, a base transceiver station (BTS), a radio base station, a radio transceiver, an access point, an access node, a road side unit (RSU), a radio remote head (RRH), a transmission point (TP), a transmission and reception point (TRP), a flexible TRP (f-TRP), gNB, a relay node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, a device supporting internet of things (IoT) functions, a mounted module/device/terminal, an on-board unit (OBU), or the like.

Each of the plurality of communication nodes 110-1, 110-2, 110-3, 120-1, 120-2, 130-1, 130-2, 130-3, 130-4, 130-5, and 130-6 may support the cellular communication (e.g., long-term evolution (LTE), LTE-Advanced (LTE-A), or the like defined in the $3^{rd}$ generation partnership project (3GPP) standards). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink transmissions and SC-FDMA-based uplink transmissions. Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, retransmission techniques in a multi-carrier communication system will be described. Here, even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 3:
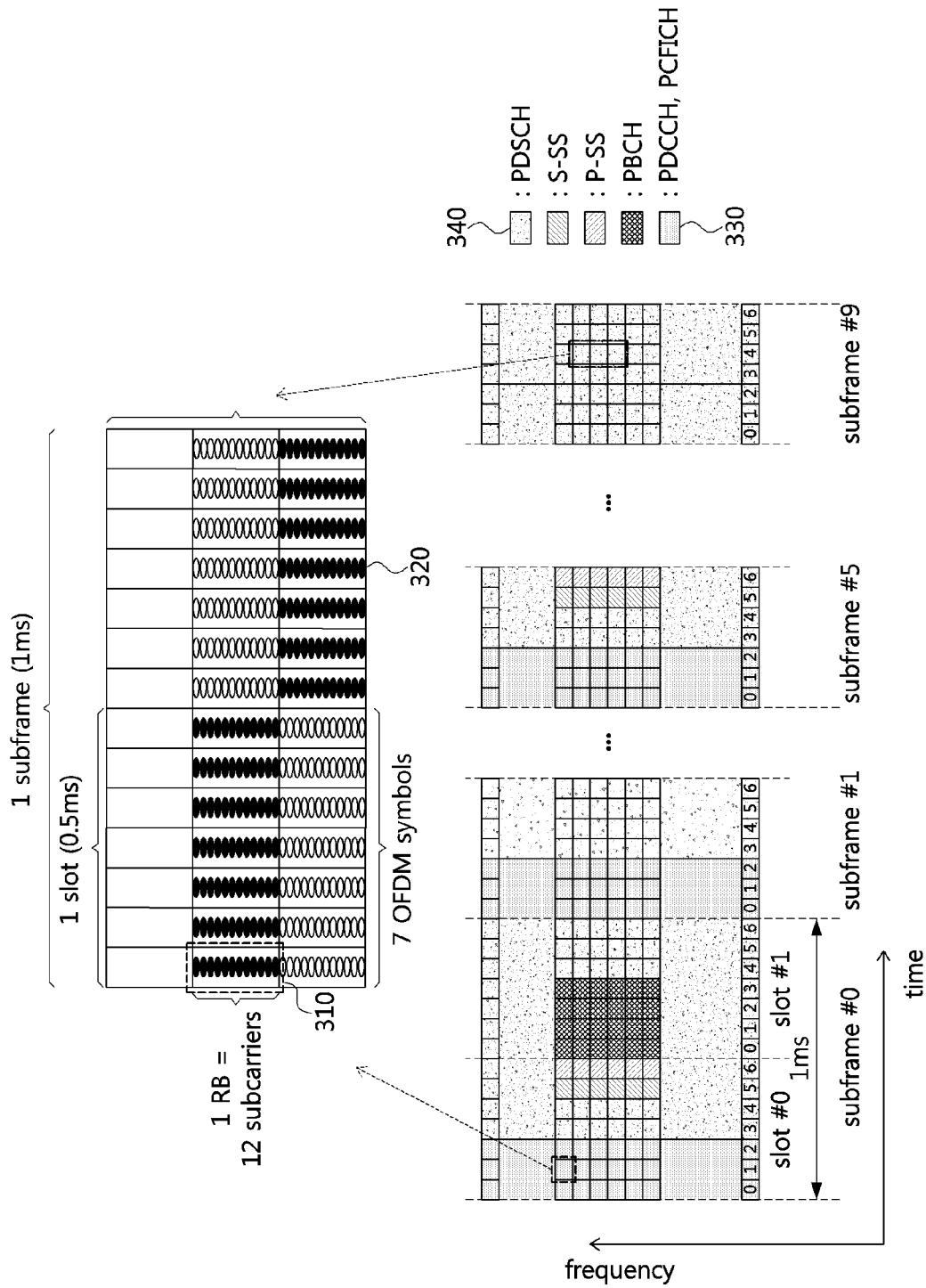
FIG. 3 is a conceptual diagram illustrating a resource block structure in the 3GPP LTE and LTE-A.

FIG. 3 is a conceptual diagram illustrating a resource block structure in the 3GPP LTE and LTE-A.

Referring to FIG. 3, resource elements (REs) to which a resource block (RB) 310, which is a basic scheduling unit of a data channel (e.g., physical data shared channel (PDSCH), is allocated are illustrated. The OFDM scheme, which is a typical scheme of a multi-carrier communication system, is used in the 3GPP LTE and LTE-A (hereinafter, collectively referred to as LTE) and 5G new radio (NR). In LTE and NR, scheduling of radio communication resources for a terminal may be performed in units of an RB.

The RB 310 may include a plurality of subcarriers in the frequency axis and a slot including a plurality of OFDM symbols in the time axis. In this case, one subcarrier in the frequency axis and one OFDM symbol in the time axis may be referred to as one resource element (RE).

In case of LTE, the RB 310 may occupy a time of 7 OFDM symbols corresponding to one slot in the time axis and occupy a frequency band corresponding to 12 subcarriers in the frequency axis. In case of NR, an RB having a time duration of a various length and a frequency band of a various length may be provided. For example, the size of a frequency band of one subcarrier, the number of subcarriers included in one RB, and the like may be varied, and thus the number of OFDM symbols occupied by one slot, the length of an OFDM symbol included in one slot, and the like may be varied.

Meanwhile, according to a channel bandwidth, in case of LTE, 6 RBs may be allocated to a minimum of 1.4 MHz band and 100 RBs may be allocated to a 20 MHz band. Also, in the time axis, various control channels, data channels, and reference signals (RSs) may be allocated to RBs in units of a frame comprising 10 subframes each consisting of 2 slots.

For example, a control channel such as a physical downlink control channel (PDCCH) and a physical control format indicator channel (PCFICH) 330 may be allocated up to the first three slots of each subframe, and a primary synchronization signal (PSS), a secondary synchronization signal (SSS), a physical broadcast channel (PBCH), and the like may be allocated according to a predetermined periodicity. A PDSCH 340, which is a payload for the terminal, may be allocated to the remaining regions.

The control information, the reference signal, and the payload in the control channel allocated to the RB may be referred to as data. The data becomes data in symbol units through modulation and coding before being mapped to the RB, so that the data may also be referred to as data symbols. Hereinafter, an OFDM symbol sampling synchronization error will be described.

Figure 4:
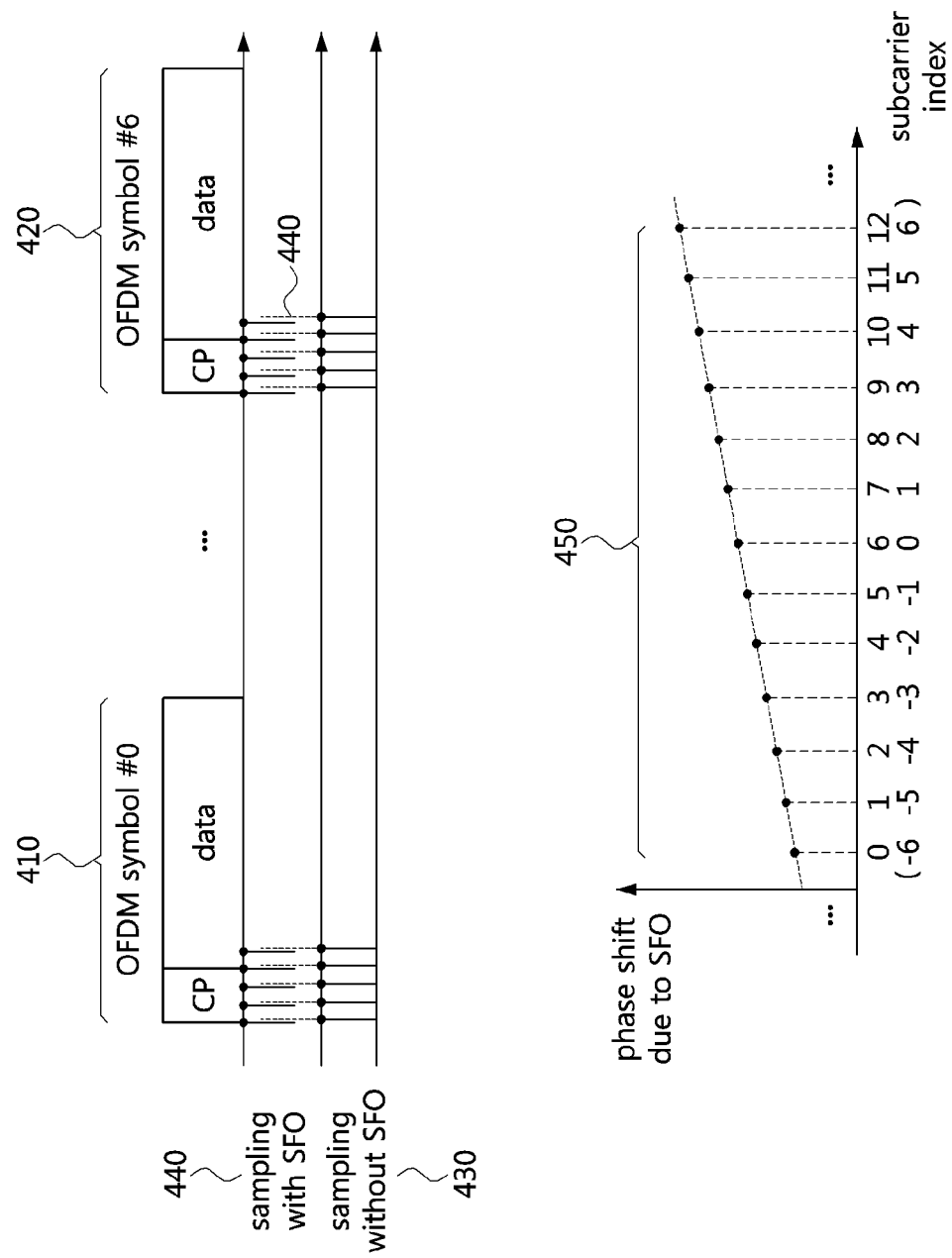
FIG. 4 is a conceptual diagram illustrating a sampling offset of a received OFDM symbol and a phase shift due to the sampling offset in an OFDM receiver.

FIG. 4 is a conceptual diagram illustrating a sampling offset of a received OFDM symbol and a phase shift due to the sampling offset in an OFDM receiver.

Referring to FIG. 4, it is illustrated that a sampling frequency offset (SFO) occurs due to a frequency synchronization impairment when an OFDM symbol is transmitted through a radio channel and is received at a receiving apparatus. As described above, the OFDM communication system has characteristics of being sensitive to high PAPR and frequency error. Especially, the OFDM communication system is more susceptible to a carrier frequency offset (CFO) and a sampling frequency offset (SFO) among frequency errors.

The CFO and SFO may be caused by a mismatch between an oscillator in a transmitting apparatus and an oscillator in a receiving apparatus. That is, the CFO and SFO may occur when a carrier frequency and a sampling frequency applied at the time of data transmission in the transmitting apparatus are different from a carrier frequency and a sampling frequency applied to the receiving apparatus. The CFO and SFO may occur when data is received at the receiving apparatus after passing through a radio channel and the received carrier frequency and the sampling frequency are changed due to influence of the radio channel. Also, the CFO and SFO may occur when a sampling frequency of a digital-to-analog converter (DAC) in the transmitting apparatus does not coincide with a sampling frequency of an analog-to-digital converter (ADC) in the receiving apparatus.

Referring to FIG. 4, in the first OFDM symbol 410 and the last OFDM symbol 420 of an arbitrary slot in an RB in a specific frequency band and a specific time period, a sampling timing for a case 430 of performing symbol-unit sampling when SFO does not occur and a sampling timing for a case 440 of performing symbol-unit sampling when SFO occurs are illustrated.

Such the CFO and SFO may cause a phase error, a received signal amplitude distortion, ICI, a phase rotation of subcarriers, and the like, and may affect demodulation and decoding of the received signal at the receiving apparatus as noise. In particular, the phase rotation may vary depending on a subcarrier index. Referring to FIG. 4, it is illustrated that the phase rotation (the amount of noise occurring due to the phase shift) of a received OFDM symbol is proportional to a subcarrier index. That is, the phase rotation increases in a direction in which a frequency increases (i.e., in a frequency-increasing direction). In order to solve this problem, the receiving apparatus may perform an operation for removing the CFO and SFO.

On the other hand, a method of reducing the variability of the SFO that is proportional to the variation of the subcarrier index may be considered. Hereinafter, a method of mapping data to subcarriers within an RB for reducing the SFO variability in a multi-carrier system according to an embodiment of the present disclosure will be described.

Figure 5:
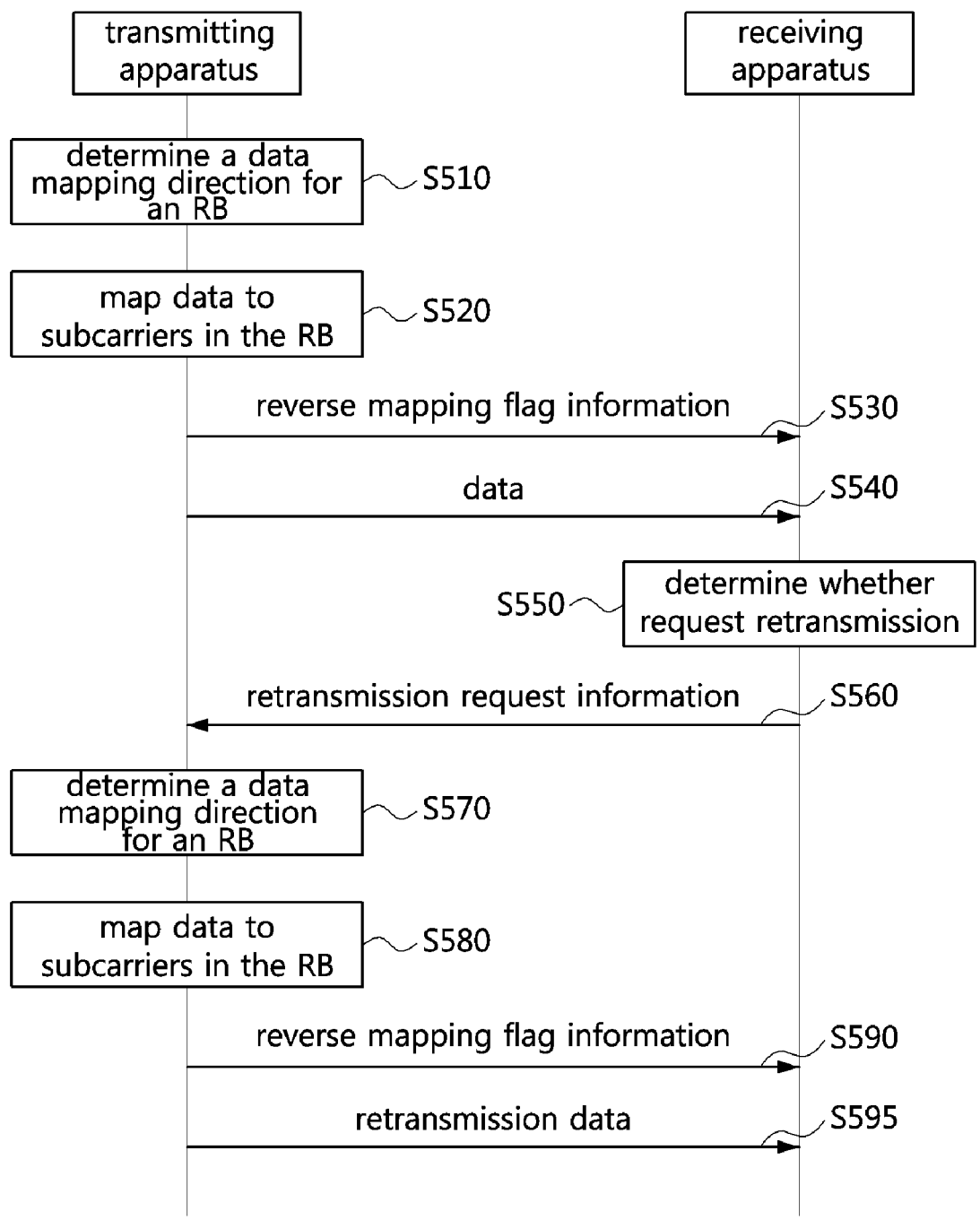
FIG. 5 is a sequence chart illustrating a method of mapping data to subcarriers within an RB for reducing SFO variability according to an embodiment of the present disclosure.

FIG. 5 is a sequence chart illustrating a method of mapping data to subcarriers within an RB for reducing SFO variability according to an embodiment of the present disclosure.

Referring to FIG. 5, illustrated is a procedure in which data symbols are mapped and transmitted in different frequency-axis directions based on reverse mapping flag information (i.e., information including a reverse mapping flag) when the data is initially transmitted or retransmitted from a transmitting apparatus (e.g., base station or terminal) to a receiving apparatus (e.g., terminal or base station). The data mapping method according to an embodiment of the present disclosure may be applied even when the transmitting and receiving apparatuses are wireless local area network (WLAN) transmitting and receiving apparatuses.

When data to be transmitted from the transmitting apparatus to the receiving apparatus is generated and the transmitting apparatus maps the corresponding data to subcarriers within an RB allocated to the data by a scheduler, the transmitting apparatus may determine whether the data is to be mapped in a direction in which the subcarrier index increases or in a direction in which the subcarrier index decreases (S510). For example, when the data is initially transmitted, the data may be mapped in the direction (referred to as a 'first direction') in which the subcarrier index increases. On the other hand, when the data is retransmitted, the data may be mapped in the direction (referred to as a 'second direction') in which the subcarrier index decreases.

Alternatively, the data may be mapped in the second direction when the data is initially transmitted, and the data may be mapped in the first direction when the data is retransmitted. Alternatively, the data may be mapped in the first direction in case of the initial transmission and the even-numbered retransmissions, and the data may be mapped in the second direction in case of the odd-numbered retransmissions. Alternatively, the data may be mapped in the first direction in case of the initial transmission and the odd-numbered retransmissions, and the data may be mapped in the second direction in case of the even-numbered retransmissions.

In addition to the direction in which the subcarrier index is incremented or decremented by one, the data may also be mapped in a direction of increasing or decreasing the subcarrier index by n. Also, when the data mapping within one RB is completed, the data may be mapped from the minimum subcarrier or the maximum subcarrier index in a next empty RB. That is, the type of increasing or decreasing the subcarrier index when mapping data to subcarrier may vary according to a situation of the applied multi-carrier communication system.

After the data mapping according to the determined data mapping direction (S520), the transmitting apparatus may transmit the reverse mapping flag information applied to the corresponding data to the receiving apparatus (S530). The reverse mapping flag information according to an embodiment of the present disclosure may be configured as '1' (i.e., the reverse mapping flag is represented as 'set', 'configured', or 'ON') to indicate the first direction and may be configured as '0' (i.e., the reverse mapping flag is represented as 'reset', 'clear', or 'OFF') to indicate the second direction. On the other hand, the reverse mapping flag information according to another embodiment of the present disclosure may be configured as '0' to indicate the first direction and may be configured as '1' to indicate the second direction.

The reverse mapping flag information may be transmitted for units of one or more RBs for a specific receiving apparatus. Alternatively, the reverse mapping flag information may be transmitted together with reverse mapping flag information for one or more RBs for another receiving apparatus. In this case, the reverse mapping flag information may occupy a region of 2 bits or more.

The reverse mapping flag information may be transmitted as included in a control channel carrying control information for recovery of the data. An example of such the control channel may be a PDCCH of the LTE, specifically downlink control information (DCI) included in the PDCCH. Alternatively, the reverse mapping flag information may be transmitted through a reserved field of the existing control channel, may be transmitted by replacing a part of the existing control channel, or may be transmitted through a region other than the existing control channel. Alternatively, the reverse mapping flag information may be transmitted as assigned to a newly-defined control channel.

The transmitting apparatus may then transmit the data to the receiving apparatus (S540). Here, the data may be payload data such as the PDSCH, a control channel such as the PDCCH or the PCFICH, or system information such as the PBCH. The receiving apparatus may determine the data mapping direction for the data based on the reverse mapping flag information included in the control channel for the corresponding data received from the transmitting apparatus, and perform a demodulation procedure (e.g., log-likelihood ratio (LLR), hard-decision, or the like) and a recovery procedure on the data based on the determined data mapping direction.

Thereafter, the receiving apparatus may determine whether to request retransmission of the data (S550). The receiving apparatus may then transmit to the transmitting apparatus retransmission request information (e.g., acknowledgment (ACK) or non-acknowledgment (NACK)) indicating whether or not a retransmission is required (S560). When the retransmission is required based on the retransmission request information received from the receiving apparatus, the transmitting apparatus may determine the data mapping direction again (S570).

That is, in the case of the retransmission as described above, the transmitting apparatus may determine the data mapping direction in consideration of whether the retransmission is the odd-numbered retransmission or the even-numbered retransmission. The transmitting apparatus may map the retransmission data to the subcarriers within the RB according to the determined data mapping direction (S580).

After mapping the retransmission data to subcarrier within the RB according to the determined data mapping direction (S580), the transmitting apparatus may transmit reverse mapping flag information applied to the retransmission data to the receiving apparatus (S590). Thereafter, the transmitting apparatus may transmit the retransmission data to the receiving apparatus (S595). The change of the data mapping direction according to the initial transmission and the retransmission may normalize the phase rotation and the phase fluctuation at the receiving apparatus, so that the retransmission recovery efficiency at the time of data recombination in the receiving apparatus can be improved.

On the other hand, in the change of the data mapping direction according to an embodiment of the present disclosure, the data mapping direction may be changed even when the data is mapped for initial transmission or retransmission regardless of the initial transmission or the retransmission. That is, even during data mapping for the initial transmission, the data mapping may be performed by changing the data mapping direction. In this case, when the data (retransmission data) is transmitted to the receiving apparatus, reverse mapping flag information may be transmitted to the receiving apparatus in advance or together with the corresponding data. Hereinafter, SFO variability according to a subcarrier index in case of applying the data mapping method according to an embodiment of the present disclosure will be described.

Figure 6:
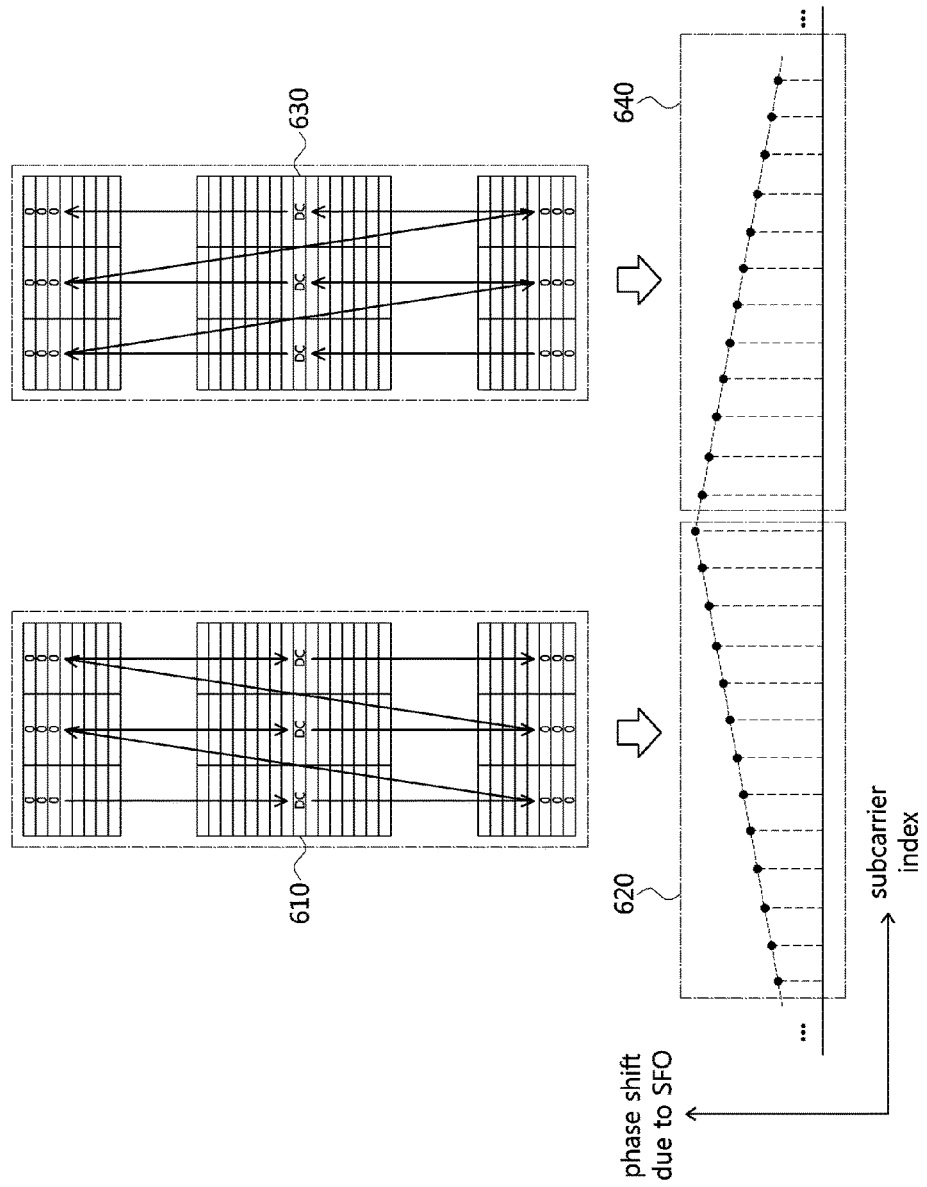
FIG. 6 is a conceptual diagram illustrating mitigation of SFO variability according to a subcarrier index when a data mapping method according to an embodiment of the present disclosure is applied.

FIG. 6 is a conceptual diagram illustrating mitigation of SFO variability according to a subcarrier index when a data mapping method according to an embodiment of the present disclosure is applied.

Referring to FIG. 6, according to an embodiment of the present disclosure, when data is mapped to subcarriers within an RB, the data mapping direction may be changed in the initial transmission and the retransmission, so that the SFO variability can be normalized. When the data is mapped to the subcarriers within the RB 610 in a direction in which a frequency decreases in the frequency axis (i.e., in a frequency-decreasing manner), the phase shift due to the SFO may increase (i.e., as indicated by 620) as the subcarrier index increases as the frequency to which the data is allocated decreases.

The transmitting apparatus may allocate the retransmission data to the subcarriers within the RB 630 in a direction in which a frequency increases in the frequency axis (i.e., in a frequency-increasing direction). In this case, the phase shift due to the SFO may decrease (e.g., as indicated by 640) as a subcarrier index decreases as the frequency to which the data is allocated increases.

On the other hand, in case that the subcarrier index is configured to decrease in the frequency-decreasing direction, when the frequency to which the data is allocated decreases, the phase shift due to the SFO may decrease (e.g., as indicated by 640) as the subcarrier index decreases as the frequency to which the data is allocated decreases. In this case, when the data is retransmitted, the transmitting apparatus may map the retransmission data to the subcarriers within the RB 630 in the frequency-increasing direction.

In this case, the phase shift due to the SFO may increase (e.g., as indicated by 620) as the subcarrier index increases as the frequency to which the data is allocated increases. Hereinafter, a case of applying the data mapping method according to an embodiment of the present disclosure to a mobile communication system will be described.

Figure 7:
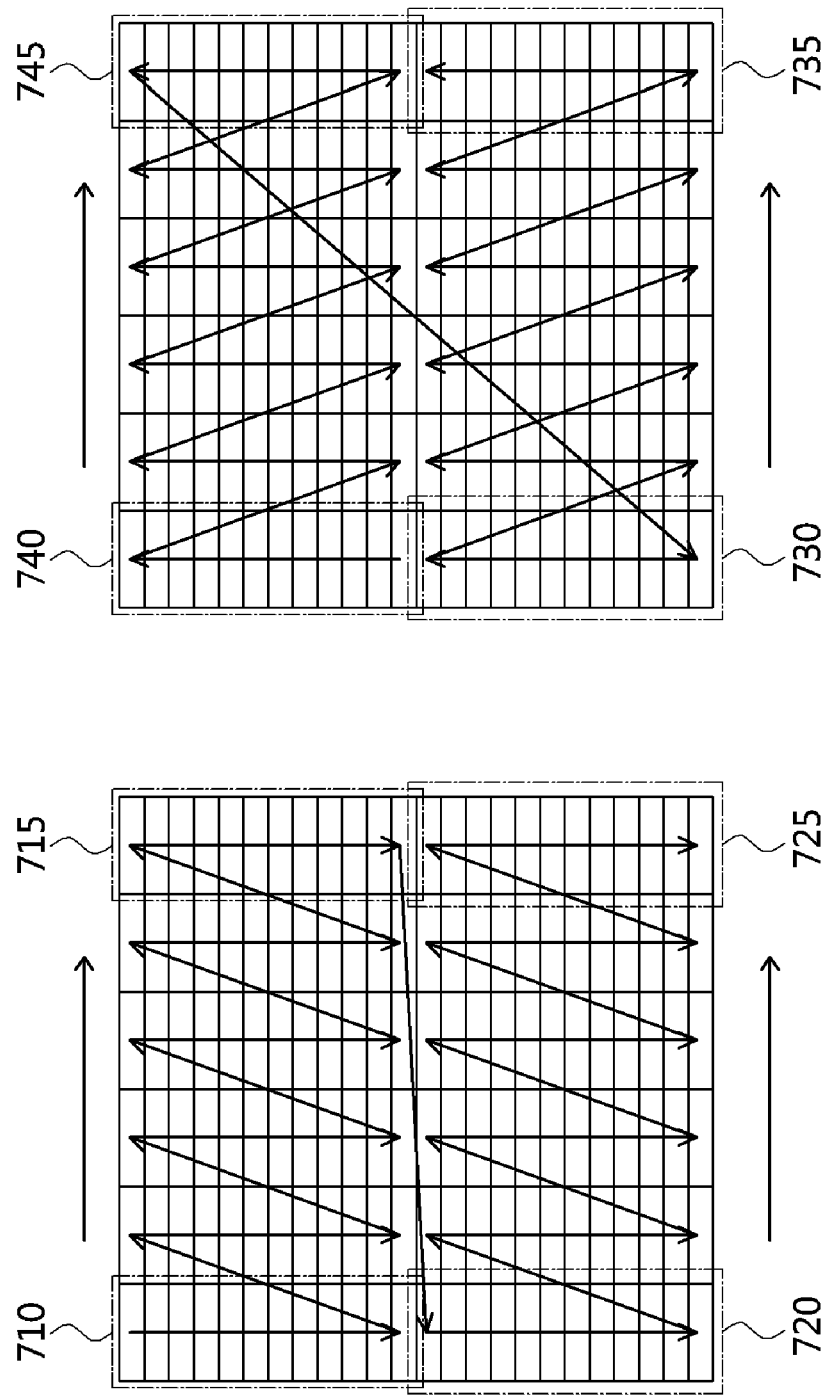
FIG. 7 is a conceptual diagram illustrating a data mapping method for enhancing data retransmission efficiency in 3GPP LTE according to an embodiment of the present disclosure.

FIG. 7 is a conceptual diagram illustrating a data mapping method for enhancing data retransmission efficiency in 3GPP LTE according to an embodiment of the present disclosure.

Referring to FIG. 7, when data is mapped in a frequency axis in units of an RB composed of 12 subcarriers, data mapping may be performed in a frequency-axis direction opposite to each other in initial transmission and retransmission according to an embodiment of the present disclosure. In particular, the data mapping direction in the initial transmission (or, retransmission, even-number retransmission, or odd-numbered retransmission) determined by a scheduler or the like may be the frequency-decreasing direction. However, the embodiment is not limited to thereto, and the frequency-increasing direction may also be applied thereto.

As described above, in case of LTE, one RB 710, 720, 730, or 740 occupies 12 consecutive subcarriers in the frequency axis and occupies 0.5 ms in the time axis. According to an embodiment of the present disclosure, in the initial transmission of specific data, the data may be mapped to subcarriers within one RB in a frequency-decreasing direction (in this case, a reverse mapping flag is not set). It may be possible to perform data mapping from the upper leftmost RB 710 in an allocated frequency band toward the upper rightmost RB block 715 in the same frequency band.

When the data mapping in the corresponding frequency band is completed, the data mapping may be performed in a frequency-decreasing direction. That is, the data mapping may be performed from the leftmost RB 720 in the next frequency band toward the rightmost RB 725 in the corresponding frequency band. The transmitting apparatus may transmit reverse mapping flag information in advance to the receiving apparatus through a DCI of a PDCCH, which includes control information for the corresponding data. In case of the embodiment shown in FIG. 7, since the data mapping is performed in the frequency-decreasing direction, the reverse mapping flag information is not configured. Then, the transmitting apparatus may transmit the RBs to which the data is mapped as the PDSCH to the receiving apparatus.

The receiving apparatus may perform a data recovery procedure such as demodulation of data based on the received reverse mapping flag information, and then transmit to the transmitting apparatus information on whether retransmission of the data is required (i.e., retransmission request information). Thereafter, the transmitting apparatus may receive the retransmission request information for the corresponding data from the receiving apparatus.

In this case, when retransmission for the corresponding data is requested through the retransmission request information, the scheduler of the transmission apparatus may perform data mapping in the direction opposite to the direction for the initial transmission, and retransmit the data. That is, contrary to the initial transmission, the transmitting apparatus may perform data mapping from the lower leftmost RB 730 in an allocated frequency band toward the lower rightmost RB 735 in the same frequency band.

When the data mapping in the corresponding frequency band is completed, the data mapping may be performed in the frequency-increasing direction. That is, the data mapping may be performed from the leftmost RB 740 in the next frequency band toward the rightmost RB 745 in the corresponding frequency band. Before retransmission of the data, the transmitting apparatus may transmit reverse mapping flag information (in this case, a reverse mapping flag is set) to the receiving apparatus through a DCI of a PDCCH, which includes control information for the corresponding data.

The receiving apparatus may perform a data recovery procedure such as demodulation of the retransmission data based on the received reverse mapping flag information, and then transmit to the transmitting apparatus information on whether retransmission of the data is required (i.e., retransmission request information). Hereinafter, a case of applying a data mapping method according to an embodiment of the present disclosure to a WLAN system will be described.

Figure 8:
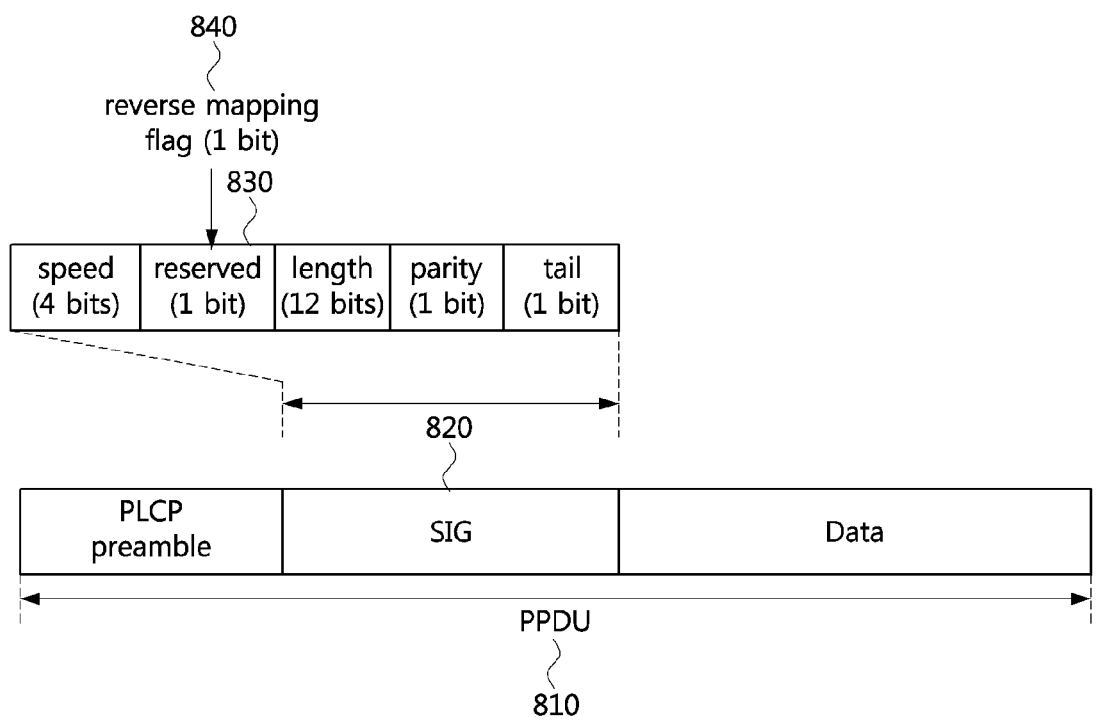
FIG. 8 is a conceptual diagram illustrating a control channel for transmitting reverse mapping flag information indicating a data mapping direction for an RB block in a WLAN according to an embodiment of the present disclosure.

FIG. 8 is a conceptual diagram illustrating a control channel for transmitting reverse mapping flag information indicating a data mapping direction for an RB block in a WLAN according to an embodiment of the present disclosure.

Referring to FIG. 8, there is shown a signal (SIG) field for transmitting control information including reverse mapping flag information in a wireless communication system compliant with the Institute of Electrical and Electronics Engineers (IEEE) 802.11 a/g specification, which is an example of WLAN. The method of mapping data to a resource block for increasing data retransmission efficiency according to an embodiment of the present disclosure may be applied to a WLAN using the multi-carrier scheme such as OFDM.

That is, when data is transmitted from a WLAN transmitting apparatus to a WLAN receiving apparatus, the direction of data mapping may be changed in the initial transmission and the retransmission. Even in this case, the transmitting apparatus may transmit reverse mapping flag information indicating the direction of data mapping to the receiving apparatus. Specifically, the reverse mapping flag information may be transmitted through a SIG field 820 of a physical protocol data unit (PPDU). A detailed description thereof is as follows.

In a physical layer of the WLAN, additional information (e.g., a physical layer convergence procedure (PLCP) preamble and the SIG 820) including control information necessary for a physical layer transceiver may be added to a physical service data unit (PSDU) (820)) transferred from a medium access control (MAC) layer, so that a PPDU is generated.

In this case, the SIG field 820 may include rate information, length information, parity information, and tail information as header information for the PPDU 810. Also, the SIG field 820 may include a 1-bit reserved region 830, and may be used as a region for transmitting the reverse mapping flag information 840.

Meanwhile, in case of the WLAN, the SIG field may be changed according to a supported data transmission rate. That is, a high throughput signal (HT-SIG) field in IEEE 802.11n, a very high throughput signal (VHT-SIG) field in IEEE 802.11ac, and a high efficiency signal (HE-SIG) field in IEEE 802.11ax may be a control information region for a PPDU. Therefore, the reverse mapping flag information according to an embodiment of the present disclosure may be transmitted through the control information region supported by the WLAN to which the embodiment is applied.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a transmitting apparatus in a wireless communication system, the operation method comprising:
   transmitting, to a receiving apparatus, reverse mapping flag information indicating a direction of mapping data symbols to one or more subcarriers included in a resource block allocated to the receiving apparatus;
   mapping the data symbols to the one or more subcarriers of the resource block based on the reverse mapping flag information; and
   transmitting the resource block to the receiving apparatus, wherein the reverse mapping flag information is transmitted through at least one of a signal (SIG) field, a high throughput signal (HT-SIG) field, and a very high throughput signal (VHT-SIG) field.

2. The operation method according to claim 1, wherein the reverse mapping flag information is determined according to a transmission mode.

3. The operation method according to claim 2, wherein the transmission mode corresponds to at least one of an initial transmission, a retransmission, an odd-numbered retransmission, and an even-numbered retransmission of the data symbols to the receiving apparatus.

4. The operation method according to claim 1, wherein the direction of mapping corresponds to one of a frequency-increasing direction of subcarriers to which the data symbols are mapped and a frequency-decreasing direction of subcarriers to which the data symbols are mapped.

5. The operation method according to claim 1, further comprising receiving, from the receiving apparatus, retransmission request information indicating that the data symbols are required to be retransmitted.

6. An operation method of a receiving apparatus in a wireless communication system, the operation method comprising:
   receiving, from a transmitting apparatus, reverse mapping flag information indicating a direction of mapping data symbols to one or more subcarriers included in a resource block allocated by the transmitting apparatus; and
   receiving, from the transmitting apparatus, the data symbols mapped to the one or more subcarriers included in the resource block based on the reverse mapping flag information,
   wherein the reverse mapping flag information is received through at least one of a signal (SIG) field, a high throughput signal (HT-SIG) field, and a very high throughput signal (VHT-SIG) field.

7. The operation method according to claim 6, wherein the reverse mapping flag information is determined according to a transmission mode.

8. The operation method according to claim 7, wherein the transmission mode corresponds to at least one of an initial transmission, a retransmission, an odd-numbered retransmission, and an even-numbered retransmission of the data symbols from the transmitting apparatus.

9. The operation method according to claim 6, wherein the direction of mapping corresponds to one of a frequency-increasing direction of subcarriers to which the data symbols are mapped and a frequency-decreasing direction of subcarriers to which the data symbols are mapped.

10. The operation method according to claim 6, further comprising transmitting, to the transmitting apparatus, retransmission request information indicating that the data symbols are required to be retransmitted.

11. A receiving apparatus in a wireless communication system, the receiving apparatus comprising at least one processor, a memory storing at least one instruction executable by the at least one processor, and a transceiver controlled by the at least one processor, wherein when executed by the at least one processor, the at least one instruction is configured to:
   cause the transceiver to receive, from a transmitting apparatus, reverse mapping flag information indicating a direction of mapping data symbols to one or more subcarriers included in a resource block allocated by the transmitting apparatus;
   cause the transceiver to receive, from the transmitting apparatus, the data symbols mapped to the one or more subcarriers included in the resource block based on the reverse mapping flag information; and cause the transceiver to transmit, to the transmitting apparatus, retransmission request information indicating that the data symbols are required to be retransmitted, wherein the reverse mapping flag information is received through at least one of a signal (SIG) field, a high throughput signal (HT-SIG) field, and a very high throughput signal (VHT-SIG) field.

12. The receiving apparatus according to claim 11, wherein the reverse mapping flag information is determined according to a transmission mode.

13. The receiving apparatus according to claim 12, wherein the transmission mode corresponds to at least one of an initial transmission, a retransmission, an odd-numbered retransmission, and an even-numbered retransmission of the data symbols from the transmitting apparatus.

14. The receiving apparatus according to claim 11, wherein the direction of mapping corresponds to one of a frequency-increasing direction of subcarriers to which the data symbols are mapped and a frequency-decreasing direction of subcarriers to which the data symbols are mapped.

* * * * *